(12) United States Patent
Wu et al.

(10) Patent No.: US 10,770,017 B2
(45) Date of Patent: Sep. 8, 2020

(54) DISPLAY DEVICE

(71) Applicant: Innolux Corporation, Miao-Li County (TW)

(72) Inventors: Chun-Fu Wu, Miao-Li County (TW); Wen-Tsai Hsu, Miao-Li County (TW); Sheng-Feng Huang, Miao-Li County (TW)

(73) Assignee: INNOLUX CORPORATION, Miao-li County (TW)

( * ) Notice: Subject to any disclaimer, the term of this patent is extended or adjusted under 35 U.S.C. 154(b) by 0 days.

(21) Appl. No.: 16/250,045

(22) Filed: Jan. 17, 2019

(65) Prior Publication Data

US 2019/0244578 A1 Aug. 8, 2019

(30) Foreign Application Priority Data

Feb. 5, 2018 (CN) .......................... 2018 1 0113938

(51) Int. Cl.
*G09G 3/36* (2006.01)
*G06F 3/041* (2006.01)
*G09G 3/32* (2016.01)

(52) U.S. Cl.
CPC ......... *G09G 3/3677* (2013.01); *G06F 3/0412* (2013.01); *G06F 3/0416* (2013.01); *G09G 3/32* (2013.01); *G09G 2310/0286* (2013.01); *G09G 2310/08* (2013.01)

(58) Field of Classification Search
CPC .................. G09G 3/3677; G09G 3/32; G09G 2310/0286; G09G 2310/08; G09G 3/3266; G06F 3/0416; G06F 3/0412
See application file for complete search history.

(56) References Cited

U.S. PATENT DOCUMENTS

2016/0358666 A1* 12/2016 Pang ..................... G11C 19/287
2017/0115807 A1* 4/2017 Cho ....................... G06F 3/0416

FOREIGN PATENT DOCUMENTS

CN 104091577 A 10/2014

* cited by examiner

*Primary Examiner* — Premal R Patel
(74) *Attorney, Agent, or Firm* — McClure, Qualey & Rodack, LLP

(57) ABSTRACT

A display device including a panel having a gate driver is provided. The gate driver includes a multi-stage shift register. The N-th stage shift register includes a control module, a leakage compensation module, and an output module. The control module has a first terminal for receiving a first signal from the (N−M)-th stage shift register and a second terminal electrically connected to a node for transmitting a first signal to the node. The leakage compensation module has a third terminal electrically connected to the compensation voltage and a fourth terminal electrically connected to the node. The output module has a fifth terminal electrically connected to the node for receiving the first signal, and a sixth terminal for outputting a second signal of the N-th stage shift register for driving at least some parts of the pixel array. The compensation voltage charges the node during a touch sensing period.

20 Claims, 9 Drawing Sheets

DISPLAY DEVICE

This application claims the benefit of People's Republic of China application Serial No. 201810113938.2, filed Feb. 5, 2018, the subject matter of which is incorporated herein by reference.

BACKGROUND OF THE DISCLOSURE

Field of the Disclosure

The disclosure relates in general to a display device, and more particularly to a display device whose gate driver comprises a shift register.

Description of the Related Art

Shift registers have been widely used in the gate driver for enabling each gate line to generate a scan signal for sequentially conducting the pixel array and writing the image signal of each data line. In recent years, an amorphous silicon gate driver (ASG) technology is developed. According to the ASG technology, during the amorphous thin-film transistor process, the gate driver having thin-film transistors is directly integrated to the display panel (such as the glass substrate of the display) for replacing the use of gate driver chips. Such technology is referred as gate driver on panel (GOP) technology. The use of the ASG technology and the GOP technology reduces the quantity of liquid crystal display (LCD) chips, and therefore reduces the manufacturing cost and shortens the manufacturing time.

According to the current in-cell touch display panel, the touch function is integrated to the display unit, and no touch units are disposed on the display unit. For example, the touch function is integrated to the LCD unit, and can be implemented by an existing electrode structure of the display unit. Since the touch function and the LCD unit are integrated together, each frame needs to have one or more than one touch sensing period for sensing touch. However, during the touch sensing period, multiple clock signals provided to the shift register of the gate driver will be suspended, and the driving signal received by the output circuit of at least one stage of shift register will generate leakage during the touch sensing period and make the display quality deteriorate. Therefore, it has become a prominent task for the industries to provide a shift register circuit capable of resolving the above problems.

SUMMARY OF THE DISCLOSURE

The present disclosure relates to a shift register capable of compensating leakage and applicable to a display device.

According to one embodiment of the present disclosure, a display device comprising a panel having a gate driver is provided. The gate driver comprises multi-stage shift register. The N-th stage shift register comprises a control module, a leakage compensation module, and an output module. The control module has a first terminal for receiving a first signal from the (N−M)-th stage shift register and a second terminal electrically connected to a node for transmitting a first signal to the node. The leakage compensation module has a third terminal electrically connected to the compensation voltage and a fourth terminal electrically connected to the node. The output module has a fifth terminal electrically connected to the node for receiving the first signal, and a sixth terminal for outputting a second signal of the N-th stage shift register for driving at least some parts of the pixel array. The compensation voltage charges the node during a touch sensing period between an enable period of the first signal and an enable period of the second signal.

The above and other aspects of the disclosure will become better understood with regard to the following detailed description of the embodiment but non-limiting embodiment(s). The following description is made with reference to the accompanying drawings.

DETAILED DESCRIPTION OF THE DISCLOSURE

Figure 1:
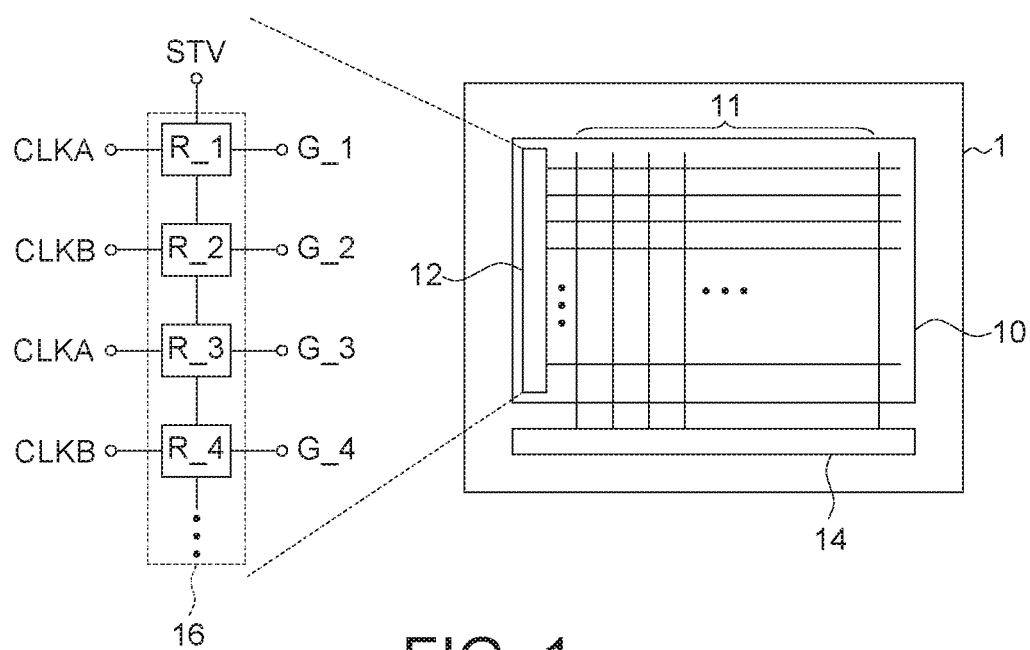
FIG. 1 is a schematic diagram of a display device according to an embodiment of the present disclosure.

FIG. 1 is a schematic diagram of a display device according to an embodiment of the present disclosure. The display device 1 comprises a panel 10, on which a pixel array 11 composed of at least one thin-film transistor (TFT) and at least one LCD element are disposed. In another embodiment, the display element can be realized by a light-emitting diode (LED), a mini LED, a micro LED or a quantum-dot LED. However, the present disclosure is not limited thereto, and any display elements can be used in the display device of the present disclosure as long as at least one transistor of the display element is used as a switch element of the pixel array 11. One side (such as the bottom side) of the panel 10 can have a data driver 14 disposed thereon for providing pixel data to the data line of the panel 10. In another embodiment, the data driver 14 can be disposed on a non-bottom side or both the bottom side and a non-bottom side of the panel 10, but the present disclosure is not limited thereto. The gate driver 12 can be disposed on another side (such as the left side) of the panel 10 for providing a scan signal to the TFT gate line of the panel 10 for driving at least some parts of the pixel array 11. In another embodiment, the gate driver 12 can be disposed on the right side or both the left side and the right side of the panel 10. However, the present disclosure is not limited thereto, and the gate driver 12 can be integrated on the panel 10 using the GOP technology. Illustratively but not restrictively, the gate driver 12 can be realized using the GOP technology in the following description of the present specification.

The gate driver 12 comprises a multi-stage shift register 16 comprising four stages of shift registers R_1, R_2, R_3 and R_4. That is, in an embodiment, R_1 is the first stage shift register, R_2 is the second stage shift register, R_3 is the third stage shift register, and R_4 is the fourth stage shift register. Although the multi-stage shift register 16 of FIG. 1 is exemplified by four stages of shift registers, it should be understood that the quantity of shift registers is not limited to four and is determined according to the resolution of the panel 10, the performance of the timing control circuit (Tcon IC) for supporting the gate driver, and the frame rate of the panel 10, but the present disclosure is not limited thereto. The multiple stages of shift registers R_1 to R_4 are electrically connected to each other and respectively output a scan signal to the TFT gate line of the panel 10 via the output ends G_1 to G_4 of the multiple stages of shift registers R_1 to R_4.

FIG. 1 illustrates a multi-stage shift register 16 comprising four stages of shift registers R_1, R_2, R_3 and R_4 electrically connected to each other. However, signal transmission between the multiple states of shift registers is not limited to the exemplification illustrated in FIG. 1. For example, the second stage shift register R_2 can receive the scan signal from the output end G_1 of the first stage shift register R_1 to generate a scan signal of the output end G_2. The third stage shift register R_3 can receive the scan signal from the first stage shift register R_1 and/or the second stage shift register R_2 to generate a scan signal of the output end G_3. That is, the signal received by a stage of shift register is not necessarily outputted from the previous stage of shift register. The first stage shift register R_1 can receive an initial signal SW, which indicates the beginning of a gate drive signal outputted from the current stage.

Besides, the four stages of the shift registers R_1 to R_4 can receive the same or different clock signals. In an embodiment, if the gate driver 12 uses two phases of clock signals having a phase difference of 180°, namely, a first clock signal CLKA and a second clock signal CLKB, then the shift registers R_1 and R_3 can receive the first clock signal CLKA, and the shift registers R_2 and R_4 can receive the second clock signal CLKB as indicated in FIG. 1. In another embodiment, if the gate driver 12 uses four phases of clock signals, namely, a first clock signal CLKA, a second clock signal CLKB, a third clock signal CLKC, and a fourth clock signal CLKD and every two clock signals have a phase difference of 90°, then the shift register R_1 can receive the first clock signal CLKA, the shift register R_2 can receive the second clock signal CLKB, the shift register R_3 can receive the third clock signal CLKC, and the shift register R_4 can receive the fourth clock signal CLKD. When more stages of shift registers are electrically connected, the operations of remaining shift registers can be obtained by the same analogy, and the similarities are not repeated here. In another embodiment, two stages of shift registers are exemplified. In an illustrative sense rather than a restrictive sense, if the enable period of the two stages of shift registers has a touch sensing period, then the phase difference between the first clock signal CLKA and the second clock signal CLKB corresponding to the two stages of shift registers will be larger than or equivalent to 180° but smaller than or equivalent to 360°.

Figure 2:
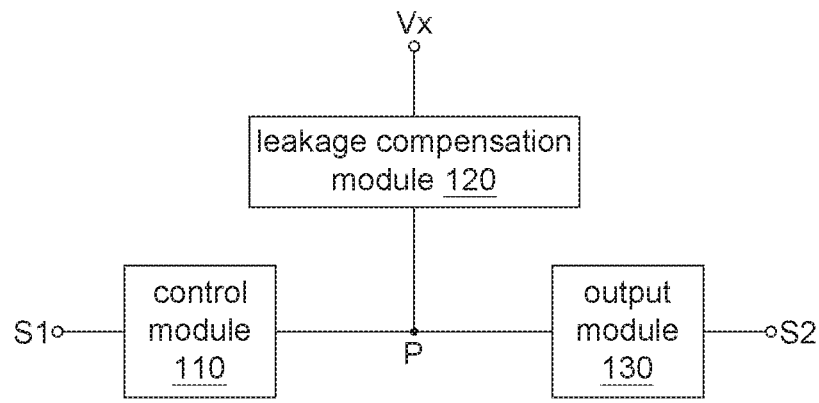
FIG. 2 is a schematic diagram of a shift register according to an embodiment of the present disclosure.

The N-th stage shift register of the multiple stages of shift registers can be obtained with reference to FIG. 2, a schematic diagram of a shift register according to an embodiment of the present disclosure. The N-th stage shift register comprises a control module 110, a leakage compensation module 120, and an output module 130. The control module 110 has a first terminal (the left end of the control module 110 as indicated in FIG. 2) and a second terminal (the right end of the control module 110 as indicated in FIG. 2), wherein the first terminal is for receiving a first signal S1 from the (N−M)-th stage shift register, the second terminal is electrically connected to a node P, the control module 110 transmits the first signal S1 to the node P, (N−M)≥1, and N and M both are positive integers. The leakage compensation module 120 has a third terminal (the upper end of the leakage compensation module 120 as indicated in FIG. 2) and a fourth terminal (the lower end of the leakage compensation module 120 as indicated in FIG. 2), wherein the third terminal is electrically connected to a compensation voltage Vx, and the fourth terminal is electrically connected to the node P. The output module 130 has a fifth terminal (the left end of the output module 130 as indicated in FIG. 2) and a sixth terminal (the right end of the output module 130 as indicated in FIG. 2), wherein the fifth terminal is electrically connected to the node P for receiving the first signal S1, and the sixth terminal outputs a second signal S2 of the N-th stage shift register for driving at least some parts of the pixel array 11. The compensation voltage Vx charges the node P during a touch sensing period Ts between an enable period of the first signal S1 and an enable period of the second signal S2.

The first signal S1 is outputted by the (N−M)-th stage shift register and corresponds to the (N−M)-th scan line of the panel. The second signal S2 is outputted by the N-th stage shift register and corresponds to the N-th scan line of the panel. The value of M is not restricted. In an embodiment, the gate driver 12 is disposed on one side of the panel 10 (such as the left side), and M can be equivalent to 1, each stage of shift register can receive the first signal S1 from a previous stage of shift register. In another embodiment, the gate driver 12 can be disposed on both sides of the panel 10 (such as the left side and the right side), and M can be equivalent to 2. In other embodiments, M can also be equivalent to a positive integer other than 2, and the present disclosure is not limited thereto.

In an embodiment as indicated in FIG. 2, the voltage level at the node P relates to the second signal S2 outputted from the N-th stage shift register. For example, when the node P is at a low voltage level, the outputted second signal S2 remains at a low voltage level, and the low voltage period of the second signal S2 can be referred as a disable period of the second signal S2. The period during which the node P is at a high voltage level relates to the period during which the second signal S2 is at a high voltage level, and the high voltage period of the second signal S2 can be referred as an enable period of the second signal S2, during which the scan signal can be provided to the panel 10. In an embodiment, the output module 130 generates the second signal S2 according to a clock signal and the voltage level at the node P.

In an in-cell touch display panel, the touch function is integrated to the display panel, a part of the period of each frame are used as a touch sensing period Ts, and multiple clock signals provided to the shift register of the gate driver 12 during the touch sensing period Ts will be suspended. The node P is charged by the compensation voltage Vx electrically connected to the leakage compensation module 120 during the touch sensing period Ts, and when the clock signal is suspended, the voltage level at the node P still can be maintained and will not be pulled down by a leakage path generated by the pull-down control circuit 114 (referring to FIG. 3) of the control module of the gate driver. Thus, the touch sensing period Ts allowed by the gate driver 12 will be prolonged, the circuit design will have lager flexibility, and the accuracy of the scan signal outputted by each stage of shift register will be maintained.

Figure 3:
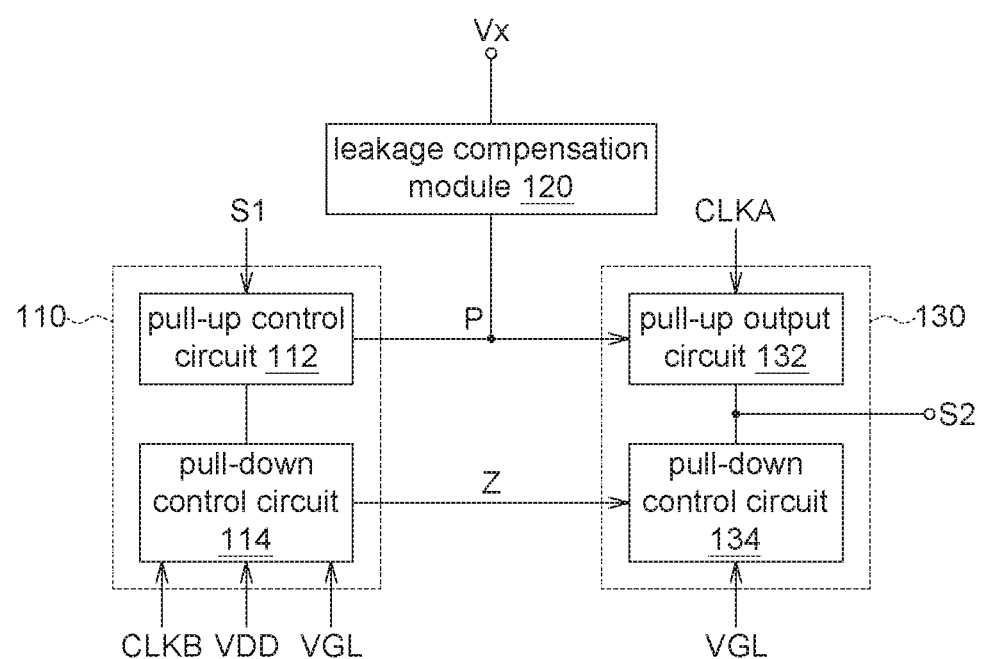
FIG. 3 is a schematic diagram of a shift register according to another embodiment of the present disclosure.

FIG. 3 is a schematic diagram of a shift register according to another embodiment of the present disclosure. In the present embodiment, the control module 110 comprises a pull-up control circuit 112 and a pull-down control circuit 114. The output module 130 comprises a pull-up output circuit 132 and a pull-down control circuit 134. The pull-up control circuit 112 adjusts the voltage level at the node P according to the first signal S1. The pull-down control circuit 114 generates a pull-down control signal Z according to a direct current high voltage level VDD and a reference voltage VGL (such as a low reference voltage). In an embodiment (referring to FIG. 3 and FIG. 8), the pull-down control signal Z has the function for stabilizing the node P at a low voltage level. That is, when the first signal S1 adjusts the voltage level at the node P without using the transistor T5, the node P is at a low voltage level. Meanwhile, the first clock signal CLKA connected to the first terminal of the transistor T6 generates a coupling voltage, which makes the voltage at the node P generate a surge voltage, which conducts the transistor T6 be conducted by mistake and output a scan signal with erroneous timing. Meanwhile, the pull-down control signal Z conducts the transistor T10 using a direct current voltage level VDD, and the voltage level at the node P is converted to a low voltage (VGL). Thus, the pull-down control signal Z has the function for stabilizing the node P at a low voltage level. In another embodiment, the pull-down control circuit 114 generates a pull-down control signal Z according to a direct current low voltage level VSS and a reference voltage VGH (such as high reference voltage) for stabilizing the node P at a high voltage level.

The pull-up output circuit 132 is for receiving the first clock signal CLKA and outputting the second signal S2 according to the voltage level at the node P. The first clock signal CLKA and the second clock signal CLKB can have a phase difference of 90°, 180°, or other values, and the value of phase difference is not specified here. The pull-down control circuit 134 can pull the second signal S2 of the output end down to the reference voltage VGL according to the pull-down control signal Z.

FIGS. 4 to 7 are circuit diagrams of a leakage compensation module 120 according to multiple embodiments of the present disclosure. In the embodiments as indicated in the diagrams, the transistors realized by N-type amorphous thin-film transistors (referred as N-type thin-film transistors here below). However, it should be understood that the N-type thin-film transistors can be replaced by P-type thin-film transistors. In another embodiment, the N/P-type thin-film transistors are realized by other types of transistors such as low temperature polysilicon thin-film transistors, metal-oxide thin-film transistors or a combination thereof. However, the present disclosure is not limited thereto, and any N/P-type thin-film transistors which can be used as switch elements are within the scope of protection of the present disclosure. In the present specification, the N-type thin-film transistors are used for exemplary and explanatory purposes, and the descriptions below can maintain consistent and easy to understand.

Figure 4:
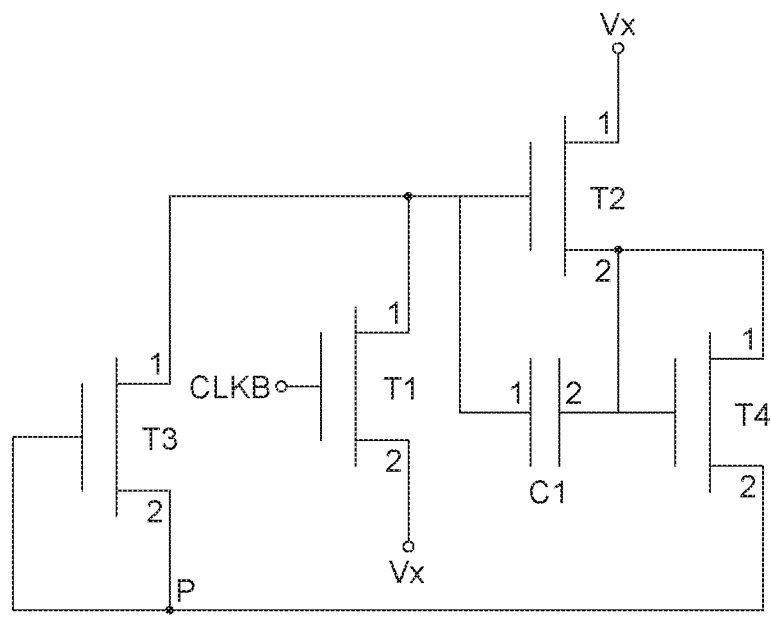
FIGS. 4 to 7 are circuit diagrams of a leakage compensation module according to multiple embodiments of the present disclosure.
Figure 5:
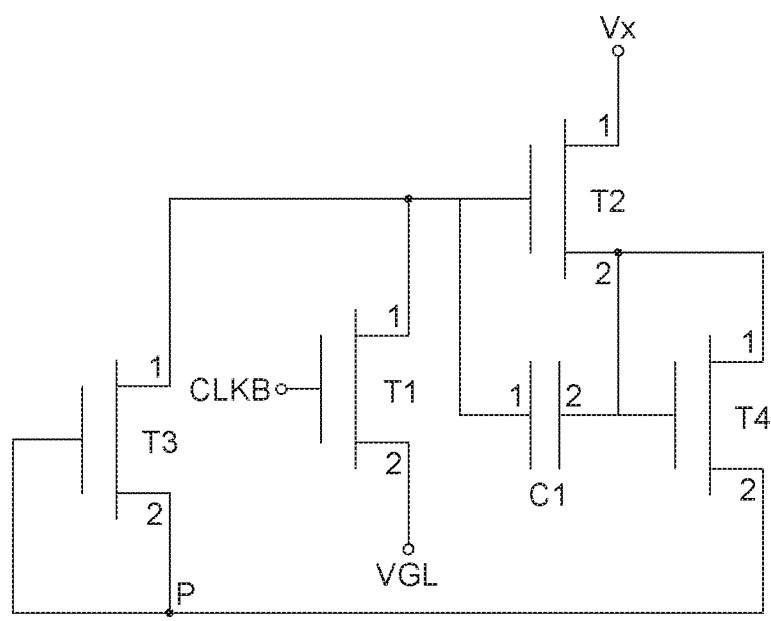

As indicated in FIG. 4, the leakage compensation module 120 further comprises a first transistor T1, a second transistor T2, a third transistor T3, a fourth transistor T4, and a capacitor C1. The third transistor T3 and the fourth transistor T4 can be selectively disposed for reducing the leakage at the node P. That is, the leakage compensation module 120 comprises a first transistor T1, a second transistor T2, and a capacitor C1, but selectively comprises the transistor T3 and/or the transistor T4. However, the present disclosure is not limited thereto, and more transistors or capacitors can be electrically connected to the leakage compensation module according to the user's requirement or the leakage characteristics of the transistors.

Refer to FIG. 4. When the transistor T3 and the transistor T4 are not included in the circuit design of the leakage compensation module 120, the node P is electrically connected to the first end of the first transistor T1, the first end of the capacitor C1, and the control end of the second transistor T2, and the node P is electrically connected to the second end of the capacitor and the second end of the second transistor T2. The control end of the transistor is such as a gate end. The first end and the second end of the transistor can be realized by such as a drain end and a source end. The correspondence relationship between the first end and the second end is not restricted, but is determined according to the voltage levels at the first end and the second end of the transistor.

When the third transistor T3 is included in the circuit design of the leakage compensation module 120, the node P is electrically connected to the control end of and the second end of the third transistor T3, and the first end of the third transistor T3 is electrically connected to the first end of the first transistor T1.

When the fourth transistor T4 is included in the circuit design of the leakage compensation module 120, the node P is electrically connected to the second end of the fourth transistor T4, and the control end and the first end of the fourth transistor T4 are electrically connected to the second end of the capacitor C1.

The first end of the second transistor T2 is electrically connected to the compensation voltage Vx outputted from the timing control circuit. In an embodiment, the timing control circuit can be integrated to a data driving integrated circuit.

In the embodiment as indicated in FIG. 4, the control end of the first transistor T1 is for receiving a second clock signal CLKB, which is the same as the second clock signal CLKB received by the pull-down control circuit 114 of FIG. 3, and the second end of the first transistor T1 is electrically connected to the compensation voltage Vx. In another embodiment, the second end of the first transistor is also electrically connected to the reference voltage VGL (referring to FIG. 5), but the present disclosure is not limited thereto.

Figure 6:
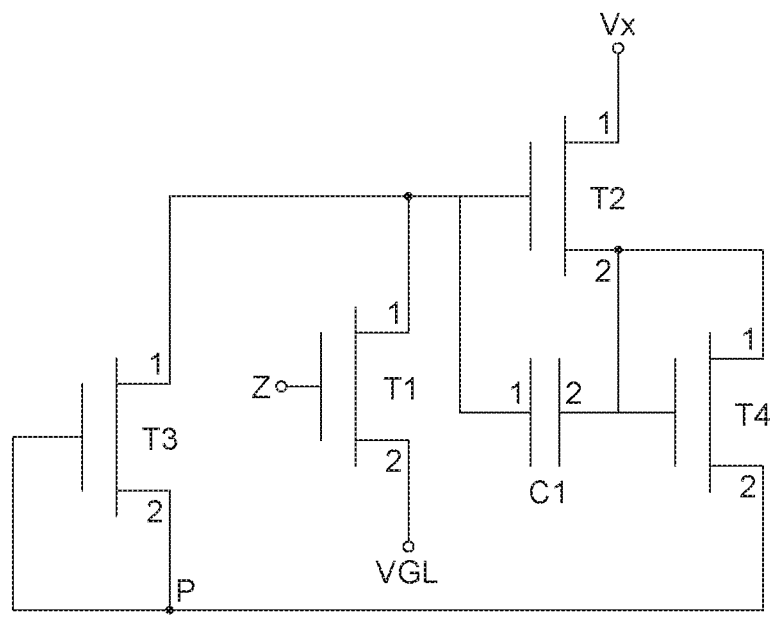
Figure 7:
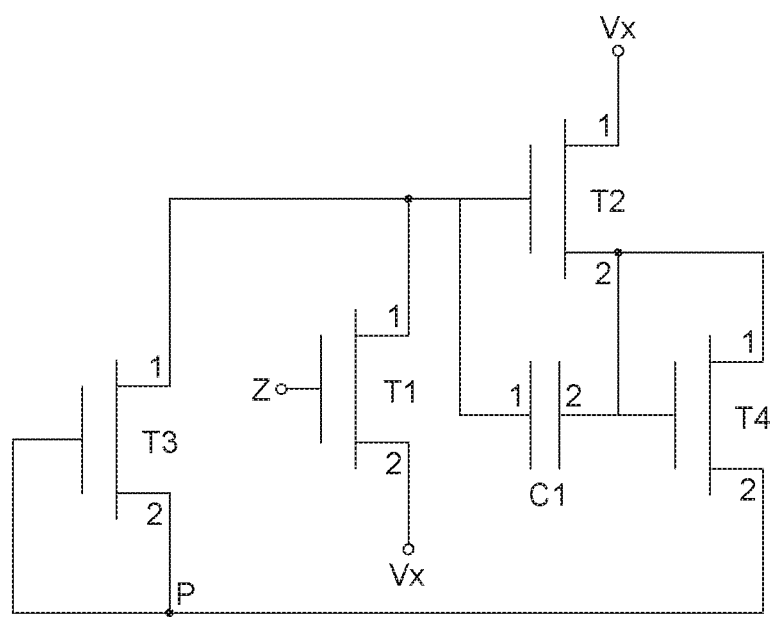

In the embodiment as indicated in FIG. 6, the control end of the first transistor T1 is for receiving a pull-down control signal Z, which is generated by the pull-down control circuit 114 of FIG. 3 according to the voltage level at the node P. The second end of the first transistor T1 is electrically connected to the reference voltage VGL, which is the same as the reference voltage VGL received by the pull-down control circuit 114 of FIG. 3. In another embodiment, the second end of the first transistor T1 is electrically connected to the compensation voltage Vx (referring to FIG. 7), but the present disclosure is not limited thereto.

Figure 8:
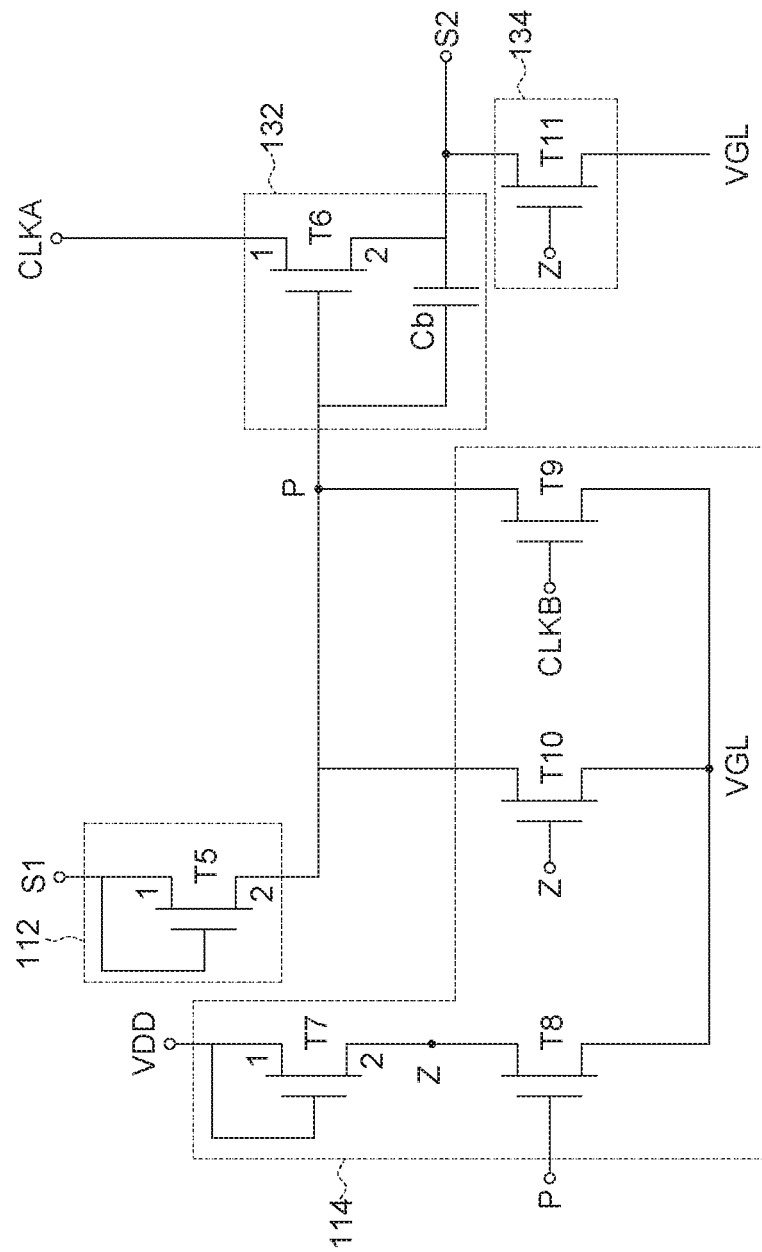
FIG. 8 is a schematic diagram of a shift register circuit not including a leakage compensation module.

The embodiments as indicated in FIGS. 4 to 7 can be used as the leakage compensation module 120 of FIG. 2 and FIG. 3. Here below, the functions of the leakage compensation module 120 in the shift register are described using signal wave-patterns. FIG. 8 is a schematic diagram of a shift register circuit not including a leakage compensation module. In the present embodiment, the pull-up control circuit 112 comprises a transistor T5. The transistor T5 is conducted when the first signal S1 is at a high voltage level, and the voltage level at the node P can be pulled up. The pull-down control circuit 114 comprises a transistor T7, a transistor T8, a transistor T9, and a transistor T10. The control end of the transistor T8 is electrically connected to the node P, and the control end of the transistor T10 is for receiving the pull-down control signal Z, and the voltage level at the node P and the pull-down control signal Z substantially have opposite phases. The control end of the transistor T9 is for receiving the second clock signal CLKB, and the control end of and the first end of the transistor T7 are for receiving a reference voltage VDD (such as a direct current high reference voltage).

The pull-down control circuit 134 comprises a transistor T11 whose control end is for receiving the pull-down control signal Z, which pulls the second signal S2 down to the reference voltage VGL when the pull-down control signal Z is at a high voltage level. The pull-up output circuit 132 comprises a transistor T6 and a capacitor Cb coupled between the node P and the second end of the transistor T6. The control end of the transistor T6 is electrically connected to the node P, and the first end of the transistor T6 is electrically connected to the first clock signal CLKA. The transistor T6 is conducted when the node P is at a high voltage level. The first clock signal CLKA pulls up the voltage level of the second signal S2.

Figure 9:
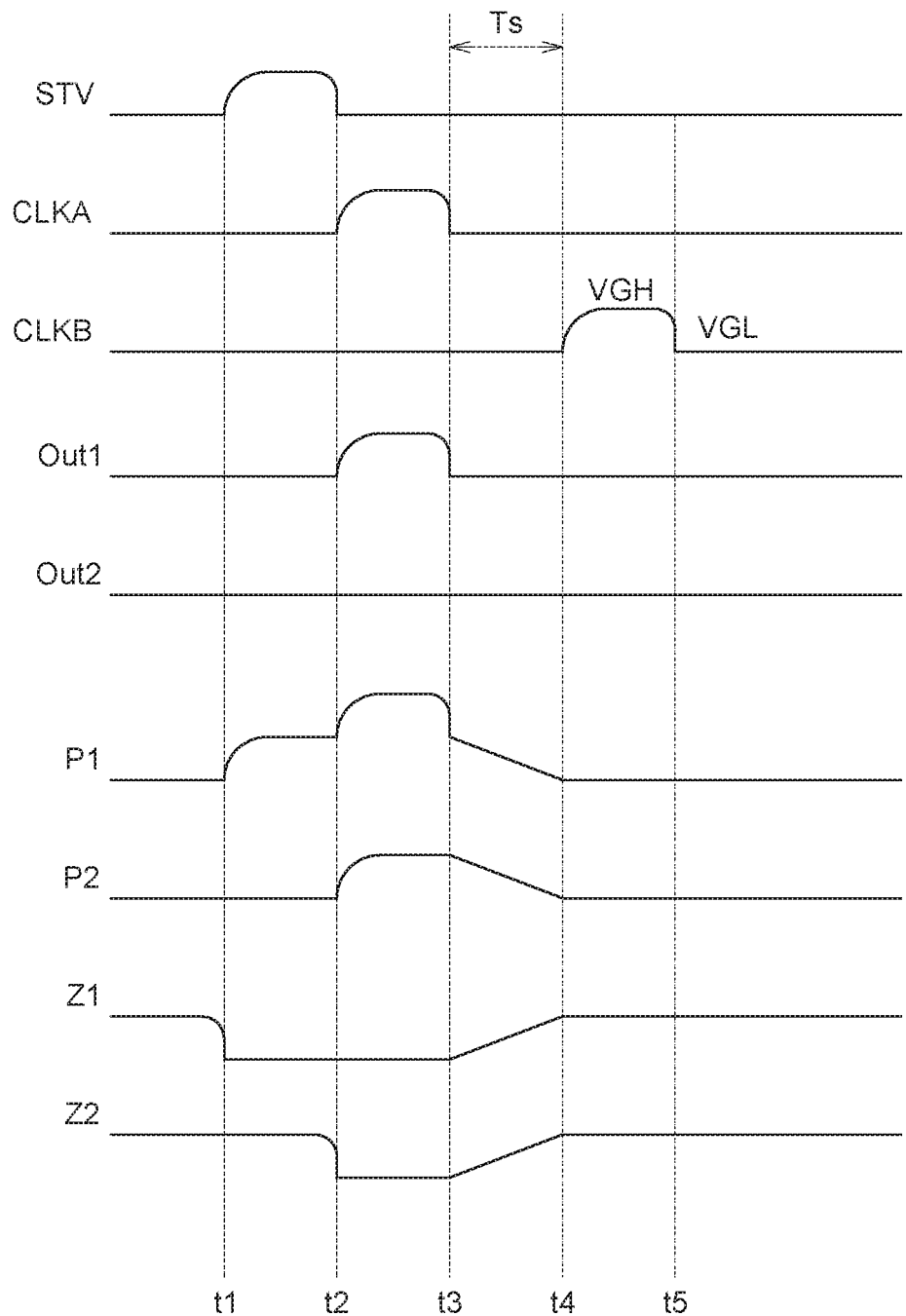
FIG. 9 is a signal wave-pattern corresponding to the circuit of FIG. 8.

FIG. 9 is a signal wave-pattern corresponding to the circuit of FIG. 8. FIG. 9 includes relevant signals of two stages of shift registers. The circuit structure of the first stage and the second stage shift registers can be obtained with reference to FIG. 8. Meanwhile, the first signal S1 of the first end of the transistor T5 of the first stage shift register is for receiving the initial signal STV; the first end of the transistor T6 is for receiving the first clock signal CLKA; the control end of the transistor T9 is for receiving the second clock signal CLKB. The first end of the transistor T5 of the second stage shift register is for receiving the first signal S1 from the first stage; the first end of the transistor T6 is for receiving the second clock signal CLKB; the control end of the transistor T9 is for receiving the first clock signal CLKA.

The first signal S1 is the scan signal outputted from the first stage shift register, and is designated by Out1 in FIG. 9. The second signal S2 is the scan signal outputted from the second stage shift register, and is designated by Out2 in FIG. 9. The signal P1 represents the voltage at the internal node P of the first stage shift register. The signal P2 represents the voltage at the node P of the second stage shift register. Similarly, the signals Z1 and Z2 respectively represent the pull-down control signal Z1 of the first stage shift register R_1 and the pull-down control signal Z2 of the second stage shift register R_2.

In the first stage shift register, during the time points t1 to t2 period, the initial signal STV pulls up signal P1 via the transistor T5. Then, during the time points t2 to t3 period, the signal P1 conducts the transistor T6, and the first clock signal CLKA pulls up the first signal S1 (corresponding to the signal Out1 of FIG. 9 between time points t2 to t3). Meanwhile, in the second stage shift register, the first signal S1 pulls up the signal P2 via the transistor T5.

Then, after the enable period of the clock signal CLKA finishes, the method proceeds to the touch sensing period Ts, that is, the period between time points t3 to t4. Meanwhile, the multiple clock signals provided to the shift register will be suspended. The charges at the node P of the second stage shift register will be gradually discharged by the transistor T9 or the transistor T10 or via the path passing through the transistor T9 and the transistor T10. As indicated in FIG. 9, during the touch sensing period Ts, the voltage level of the signal P2 is gradually pulled down but the voltage level of the pull-down control signal Z2 is gradually pulled up. After the touch sensing period Ts finishes, the multiple clock signals provided to the shift register will be resumed. If the time points t3 to t4 of the touch sensing period Ts is too long (such as over 100 μs), then the voltage level of the signal P2 may become too low due to the leakage and shut down the transistor T6. When the first end of the transistor T6 receives the second clock signal CLKB during time points t4 to t5, the second signal S2 (corresponding to the signal Out2 of FIG. 9) cannot be pulled up, and therefore the transistor T6 cannot output correct scan signals for driving at least some parts of the pixel array 11 of the panel 10.

Figure 10:
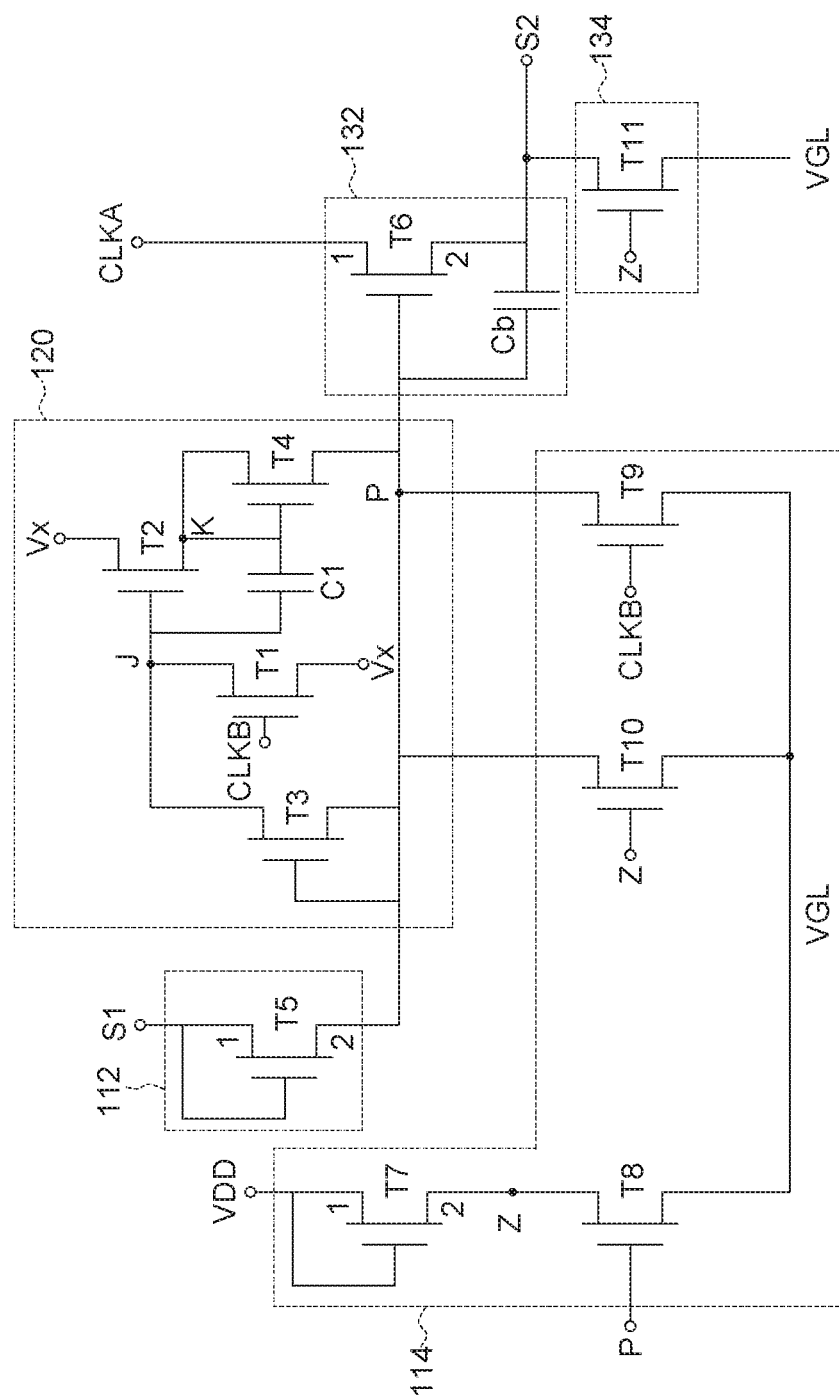
FIG. 10 is a schematic diagram of a shift register circuit having a leakage compensation module according to an embodiment of the present disclosure
Figure 11:
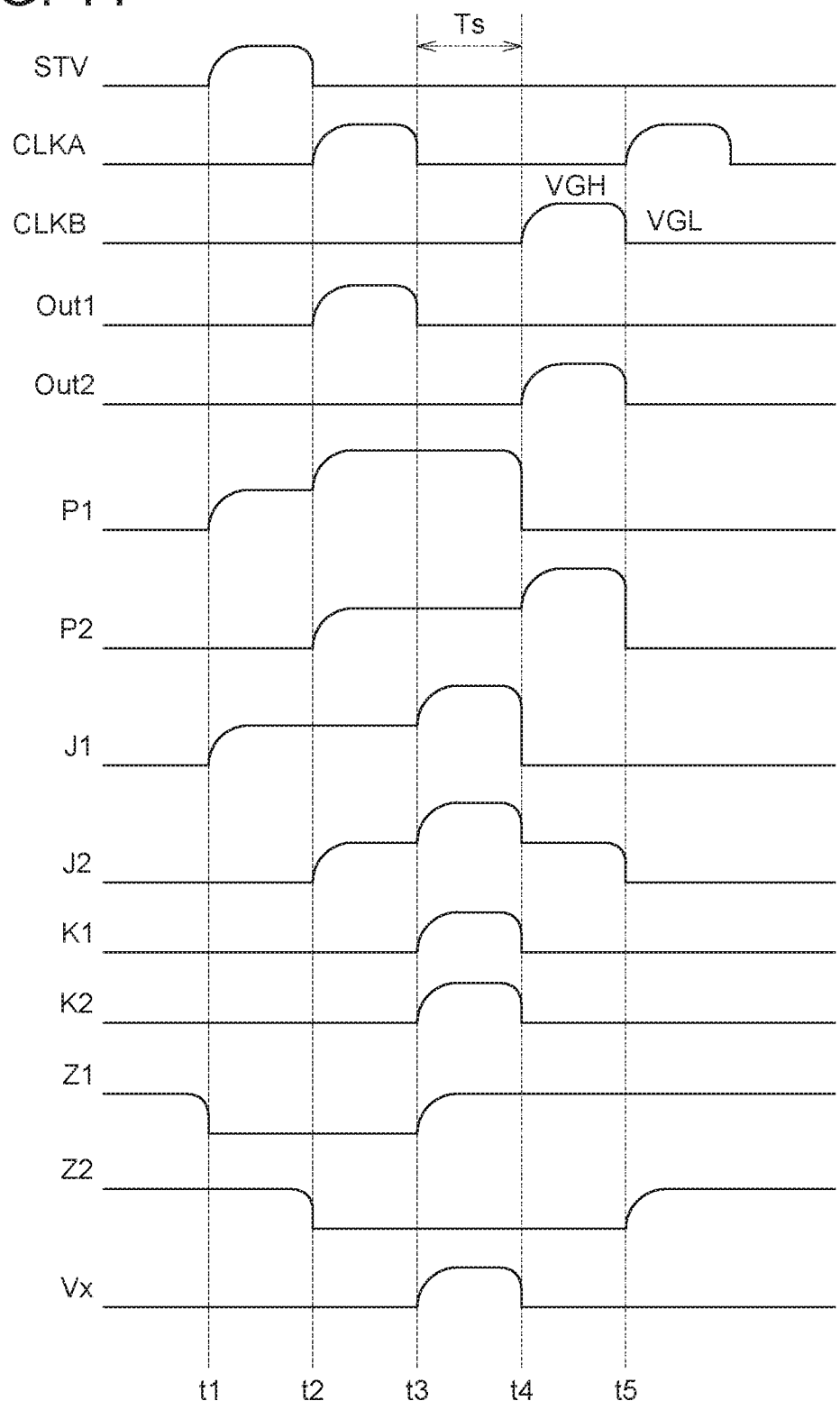
FIG. 11 is a signal wave-pattern corresponding to the circuit of FIG. 10.

FIG. 10 is a schematic diagram of a shift register circuit having a leakage compensation module according to an embodiment of the present disclosure. FIG. 10 uses the embodiments indicated in FIG. 8 and FIG. 4. FIG. 11 is a signal wave-pattern corresponding to the circuit of FIG. 10. In an embodiment, the voltage level of the compensation voltage Vx during the enable period of the first signal S1 or the enable period of the second signal S2 is lower than the voltage level of the compensation voltage Vx during the touch sensing period Ts.

FIG. 11 includes relevant signals of two stages of shift registers. The circuit structure of the first stage shift register and the second stage shift register can be obtained with reference to FIG. 10. The first end of the transistor T5 of the first stage shift register is for receiving the initial signal STV; the first end of the transistor T6 is for receiving the first clock signal CLKA; the control end of the transistor T9 is for receiving the second clock signal CLKB; the control end of the first transistor T1 is for receiving the second clock signal CLKB. The first end of transistor T5 of the second stage shift register is for receiving the first signal S1; the first end of the transistor T6 is for receiving the second clock signal CLKB; the control end of the transistor T9 is for receiving the first clock signal CLKA; the control end of the first transistor T1 is for receiving the first clock signal CLKA. Signals J1 and J2 respectively represent the voltage of the node J (the control end of the second transistor T2) of the first stage shift register and that of the second stage shift register. Signals K1 and K2 respectively represent the voltage of the node K (the second end of the second transistor T2) of the first stage shift register and that of the second stage shift register. Signals Out1 and Out2 respectively represent the scan signal outputted from the first stage shift register and that outputted from the second stage shift register.

The operations of the signal during the period between time points t1 to t2 and the period between time points t2 to t3 can be obtained with reference to FIG. 9, and are not repeated here. Then, after the enable period of the clock signal CLKA finishes, the method proceeds to the touch sensing period Ts, that is, the period between time points t3 to t4. Meanwhile, the multiple clock signals provided to the shift register are suspended, and the compensation voltage Vx is pulled up to a high voltage level from the original low voltage level during the touch sensing period Ts. In the second stage shift register, the signal P2 makes the signal J2 remain at a high voltage level (a third transistor T3 can be selectively disposed between the node P and the node J) for conducting the second transistor T2. The compensation voltage Vx pulls up the voltage level of the signal K2 to a high voltage level for charging the node P (a fourth transistor T4 can be selectively disposed between the node K and the node P). Thus, the leakage compensation module 120 maintains the node P at a high voltage level for offsetting the leakage of the node P caused by the path of the transistor T10.

The leakage compensation module 120 makes the node P maintain at a high voltage level. Therefore, even when the touch sensing period Ts between time points t3 to t4 is prolonged, the voltage level at the node P is not affected but still remains at a high voltage state. For example, even when the touch sensing period Ts is increased to 500 μs, the voltage level at the node P still remains unchanged. After the touch sensing period Ts finishes, the multiple clock signals provided to the shift register are resumed, the signal P2 maintains at a high voltage level for conducting the transistor T6. When the first end of transistor T6 receives the second clock signal CLKB during time points t4 to t5, the voltage level of the second signal S2 (corresponding to the signal Out2 of FIG. 11) is pulled up, and the transistor 6 outputs a correct scan signal to the display panel.

Refer to the wave-pattern of FIG. 11. During the touch sensing period Ts, the clock signal CLKB and the pull-down control signal Z2 both are at a low voltage level, therefore the control end of the first transistor T1 of the second stage shift register is also used for receiving the pull-down control signal Z2 (referring to the embodiments indicated in FIGS. 4 to 7), and the first transistor T1 remains in a shut-down state during the touch sensing period Ts.

During the display period (that is, the periods other than the touch sensing period Ts), the compensation voltage Vx and the reference voltage VGL both are at a low voltage level, therefore the second end of the first transistor T1 is also electrically connected to the reference voltage VGL (referring to the embodiments indicated in FIGS. 4 to 7). During the display period, it can be assured that the node J is at a low voltage level and the second transistor T2 remains at a shut-down state.

Figure 12:
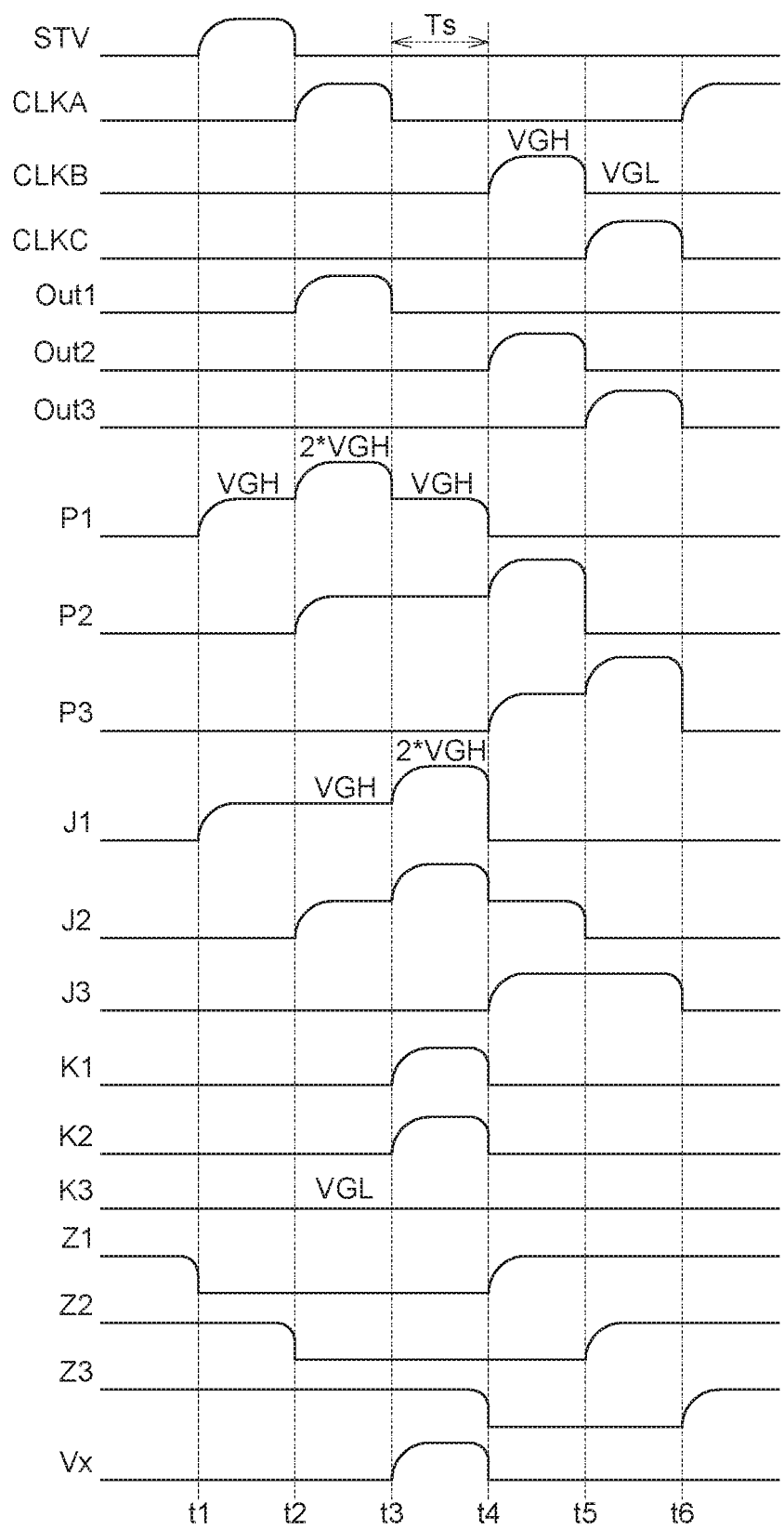
FIG. 12 is a signal wave-pattern using three-phase clock according to an embodiment of the present disclosure.

FIG. 10 and FIG. 11 are two embodiments using clock signals having two phases. However, the present disclosure is not limited thereto, and can also use the clock signals having more than two phases. FIG. 12 is a wave-pattern of the clock signals having three phases according to an embodiment of the present disclosure. FIG. 12 includes relevant signals of three stages of shift registers. The circuit structure of each stage of shift register can be obtained with reference to FIG. 10, wherein the first end of the transistor T5 of the first stage shift register is for receiving the initial signal STV; the first end of the transistor T6 is for receiving the first clock signal CLKA; the control end of the transistor T9 is for receiving the second clock signal CLKB; the control end of the first transistor T1 is for receiving the second clock signal CLKB. The first end of the transistor T5 of the second stage shift register is for receiving the first signal S1; the first end of the transistor T6 is for receiving the second clock signal CLKB; the control end of the transistor T9 is for receiving the third clock signal CLKC; the control end of the first transistor T1 is for receiving the third clock signal CLKC. The first end of the transistor T5 of the third stage shift register is for receiving the second signal S2; the first end of the transistor T6 is for receiving the third clock signal CLKC; the control end of the transistor T9 is for receiving the first clock signal CLKA. In the leakage compensation module 120 of the third shift register, the control end of the first transistor T1 is for receiving the first clock signal CLKA. The clock signals CLKA, CLKB and CLKC having three phases of the present embodiment effectively avoid the leakage path formed when the control ends of the transistors T5 and T9 are connected to the same signals. In FIG. 12, signals P1, P1 and P3 respectively represent the voltage levels at the nodes P of the first stage, the second stage and the third stage shift registers. Signals Z1, Z2 and Z3 respectively represent the pull-down control signals of the first stage, the second stage and the third stage shift registers. Signals J1, J2 and J3 respectively represent the voltage levels at the nodes J of the first stage, the second stage and the third stage shift registers. Signal K1, K2 and K3 respectively represent the voltage levels at the nodes K of the first stage, the second stage and the third stage shift registers. Signals Out1, Out2 and Out3 respectively represent the scan signals outputted from the first stage, the second stage and the third stage shift registers.

As indicated in FIG. 12, the touch sensing period Ts is between an enable period of the first signal S1 and an enable period of the second signal S2. Let the second stage shift register be taken for example. When the transistor T5 receives the first signal S1 from the previous stage, the voltage of the signal P2 is pulled up for conducting the transistor T6 (time points t2 to t3). During the touch sensing period Ts, the leakage compensation module 120 makes the signal P2 maintain at a high voltage level and keeps the transistor T6 at a conduction state (time points t3 to t4). Then, when the clock signal CLKB is enabled, the voltage of the second signal S2 is pulled up for outputting a scan signal to the display panel (time points t4 to t5). After the scan signal is outputted, the clock signal CLKC is enabled, the signal P2 is pulled down to a low voltage level via the path of the transistor T9 for shutting down the transistor T6.

According to the display device disclosed in above embodiments of the present disclosure, the shift register is equipped with a leakage compensation module for charging the node of the shift register during a touch sensing period, and the shift register can output a correct scan signal to the display panel to assure the display quality.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
a panel, comprising:
a gate driver for driving a pixel array, wherein the gate driver comprises a multi-stage shift register; an N-th stage shift register of the multi-stage shift register comprises:
a control module having a first terminal and a second terminal, wherein the first terminal is for receiving a first signal from an (N−M)-th stage shift register; the second terminal is electrically connected to a node; the control module transmits the first signal to the node; a value of (N−M) is larger than or equivalent to 1; both N and M are positive integers;
a leakage compensation module having a third terminal and a fourth terminal, wherein the third terminal is electrically connected to a compensation voltage; the fourth terminal is electrically connected to the node; and
an output module having a fifth terminal and a sixth terminal, wherein the fifth terminal is electrically connected to the node for receiving the first signal; the sixth terminal outputs a second signal of the N-th stage shift register for driving at least some parts of the pixel array;

wherein the compensation voltage charges the node during a touch sensing period between an enable period of the first signal and an enable period of the second signal.

2. The display device according to claim 1, wherein the leakage compensation module comprises:
a first transistor having a control end, a first end, and a second end;
a second transistor having a control end, a first end, and a second end; and
a capacitor having a first end and a second end;
wherein the node is electrically connected to the first end of the first transistor, the first end of the capacitor and the control end of the second transistor, and the node is electrically connected to the second end of the capacitor and the second end of the second transistor.

3. The display device according to claim 2, wherein the leakage compensation module further comprises:
a third transistor having a control end, a first end, and a second end;
wherein the node is electrically connected to the control end and the second end of the third transistor; the first end of the third transistor is electrically connected to the first end of the first transistor.

4. The display device according to claim 2, wherein the leakage compensation module further comprises:
a fourth transistor having a control end, a first end, and a second end;
wherein the node is electrically connected to the second end of the fourth transistor; and
wherein the control end of the fourth transistor and the first end of the fourth transistor are electrically connected to the second end of the capacitor.

5. The display device according to claim 2, wherein the first end of the second transistor is electrically connected to the compensation voltage.

6. The display device according to claim 5, wherein the control end of the first transistor is for receiving a clock signal; the second end of the first transistor is electrically connected to the compensation voltage.

7. The display device according to claim 5, wherein the control end of the first transistor is for receiving a clock signal; the second end of the first transistor is electrically connected to a reference voltage.

8. The display device according to claim 2, wherein the control module comprises a pull-down control circuit electrically connected to the node for generating a pull-down control signal according to the voltage level at the node; the control end of the first transistor is for receiving the pull-down control signal; the second end of the first transistor is electrically connected to the compensation voltage.

9. The display device according to claim 2, wherein the control module comprises a pull-down control circuit electrically connected to the node for generating a pull-down control signal according to the voltage level at the node; the control end of the first transistor is for receiving the pull-down control signal; the second end of the first transistor is electrically connected to a reference voltage.

10. The display device according to claim 1, wherein the voltage level of the compensation voltage during the enable period of the first signal or the enable period of the second signal is lower than the voltage level of the compensation voltage during the touch sensing period.

11. The display device according to claim 1, wherein the compensation voltage is pulled up to a high voltage level from an original low voltage level during the touch sensing period.

12. A display panel, comprising:
a gate driver for driving a pixel array, wherein the gate driver comprises a multi-stage shift register; an N-th stage shift register of the multi-stage shift register comprises:
a control module having a first terminal and a second terminal, wherein the first terminal is for receiving a first signal from an (N–M)-th stage shift register; the second terminal is electrically connected to a node; the control module transmits the first signal to the node; a value of (N–M) is larger than or equivalent to 1; both N and M are positive integers;
a leakage compensation module having a third terminal and a fourth terminal, wherein the third terminal is electrically connected to a compensation voltage, and the fourth terminal is electrically connected to the node; and
an output module having a fifth terminal and a sixth terminal, wherein the fifth terminal is electrically connected to the node for receiving the first signal, and the sixth terminal outputs a second signal of the N-th stage shift register for driving at least some parts of the pixel array;
wherein the compensation voltage charges the node from a low voltage level to a high voltage level during a touch sensing period.

13. The display device according to claim 12, wherein the leakage compensation module comprises:
a first transistor having a control end, a first end, and a second end;
a second transistor having a control end, a first end, and a second end; and
a capacitor having a first end1 and a second end;
wherein the node is electrically connected to the first end of the first transistor, the first end of the capacitor and the control end of the second transistor, and the node is electrically connected to the second end of the capacitor and the second end of the second transistor.

14. The display device according to claim 13, wherein the leakage compensation module further comprises:
a third transistor having a control end, a first end, and a second end;
wherein the node is electrically connected to the control end of the third transistor and the second end of the third transistor; the first end of the third transistor is electrically connected to the first end1 of the first transistor.

15. The display device according to claim 13, wherein the leakage compensation module further comprises:
a fourth transistor having a control end, a first end, and a second end;
wherein the node is electrically connected to the second end of the fourth transistor; and
wherein the control end of the fourth transistor and the first end of the fourth transistor are electrically connected to the second end of the capacitor.

16. The display device according to claim 13, wherein the first end of the second transistor is electrically connected to the compensation voltage.

17. The display device according to claim 16, wherein the control end of the first transistor is for receiving a clock signal; the second end of the first transistor is electrically connected to the compensation voltage.

18. The display device according to claim 16, wherein the control end of the first transistor is for receiving a clock signal; the second end of the first transistor is electrically connected to a reference voltage.

19. The display device according to claim 13, wherein the control module comprises a pull-down control circuit electrically connected to the node for generating a pull-down control signal according to the voltage level at the node; the control end of the first transistor is for receiving the pull-down control signal; the second end of the first transistor is electrically connected to the compensation voltage.

20. The display device according to claim 13, wherein the control module comprises a pull-down control circuit electrically connected to the node for generating a pull-down control signal according to the voltage level at the node; the control end of the first transistor is for receiving the pull-down control signal; the second end of the first transistor is electrically connected to a reference voltage.

* * * * *